United States Patent
Cho

(10) Patent No.: US 10,036,436 B2
(45) Date of Patent: Jul. 31, 2018

(54) METHOD OF LEARNING CLUTCH TOUCH POINT FOR DCT VEHICLE

(71) Applicant: HYUNDAI MOTOR COMPANY, Seoul (KR)

(72) Inventor: Sung Hyun Cho, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 309 days.

(21) Appl. No.: 15/168,672

(22) Filed: May 31, 2016

(65) Prior Publication Data
US 2017/0234376 A1 Aug. 17, 2017

(30) Foreign Application Priority Data
Feb. 15, 2016 (KR) .................. 10-2016-0017246

(51) Int. Cl.
*F16D 48/08* (2006.01)
*F16D 48/06* (2006.01)

(52) U.S. Cl.
CPC .......... *F16D 48/08* (2013.01); *F16D 48/062* (2013.01); *F16D 48/066* (2013.01); *F16D 2500/1026* (2013.01); *F16D 2500/10412* (2013.01); *F16D 2500/30406* (2013.01); *F16D 2500/50251* (2013.01)

(58) Field of Classification Search
None
See application file for complete search history.

(56) References Cited

U.S. PATENT DOCUMENTS

| 7,500,932 B2 * | 3/2009 | Katakura | F16H 61/061 475/123 |
| 8,768,589 B2 | 7/2014 | Ku et al. | |
| 8,777,813 B2 * | 7/2014 | Kim | B60W 10/02 477/174 |
| 2008/0305931 A1 * | 12/2008 | Eich | F16D 48/06 477/174 |
| 2013/0158825 A1 * | 6/2013 | Bader | F16D 48/06 701/68 |

(Continued)

FOREIGN PATENT DOCUMENTS

| JP | 2007-24189 A | 2/2007 |
| JP | 4972566 B2 | 7/2012 |

(Continued)

*Primary Examiner* — Ramya P Burgess
*Assistant Examiner* — Timothy Hannon
(74) *Attorney, Agent, or Firm* — Brinks Gilson & Lione

(57) ABSTRACT

A method of learning a clutch touch point for a DCT vehicle, and he method is performed to learn a touch point of an apply-side clutch in a torque phase process during gear shifting. The method includes: controlling an amount of slip of a release-side clutch in an allowable range by a controller, when gear shifting is initiated; performing torque crossing control by releasing a release-side clutch torque to a certain level while applying a clutch torque to an apply-side clutch to the same level as the release-side clutch torque by the controller, after the controlling an amount of slip of a release-side clutch; and performing learning determination so as to learn a touch point of the apply-side clutch by the controller, when the amount of slip of the release-side clutch is beyond the allowable range in the performing torque crossing control.

6 Claims, 3 Drawing Sheets

(56) References Cited

U.S. PATENT DOCUMENTS

2014/0136065 A1\* 5/2014 Yoon ................ F16D 48/06
                                              701/68
2015/0226321 A1\* 8/2015 Dunfee, II .......... F16H 61/08
                                              701/51

FOREIGN PATENT DOCUMENTS

| KR | 10-2010-0089221 A | 8/2010 |
| KR | 10-2010-0089224 A | 8/2010 |
| KR | 10-2012-0136608 A | 12/2012 |
| KR | 10-2014-0060013   | 5/2014 |
| KR | 10-2014-0103619 A | 8/2014 |
| KR | 10-2015-0011482   | 2/2015 |
| KR | 10-2015-0024212 A | 3/2015 |
| KR | 10-1510016 B1     | 4/2015 |
| KR | 10-2016-0001215 A | 1/2016 |

\* cited by examiner

METHOD OF LEARNING CLUTCH TOUCH POINT FOR DCT VEHICLE

CROSS REFERENCE TO RELATED APPLICATION

The present application claims priority to and the benefit of Korean Patent Application No. 10-2016-0017246, filed on Feb. 15, 2016, which is incorporated herein by reference in its entirety.

FIELD

The present disclosure relates to a method of learning a clutch touch point for a Dual Clutch Transmission (DCT) vehicle for shift stability.

BACKGROUND

The statements in this section merely provide background information related to the present disclosure and may not constitute prior art.

An automated manual transmission is a system which automatically controls a transmission based on a manual gearshift mechanism, and transfers an engine torque by controlling a clutch.

Accordingly, since the clutch may be excessively slipped or an impact may be induced when a variation in transfer torque is not recognized during the control of the clutch.

When a dry clutch is used in the automated manual transmission, the transfer torque characteristics and touch point of the clutch are conventionally predicted through the micro-slip control of the clutch by predicting a clutch Torque-Stroke curve (T-S curve) in real time using a transfer torque map of the dry clutch.

Particularly, the touch point is one of important factors of clutch transfer characteristics. Thus, when the touch point in the system is not recognized, deterioration of drivability such as an impact may occur during sudden acceleration and low-speed driving. Since the touch point varies according to temperatures, centrifugal force, etc., it is desired to regularly check the touch point in the system.

However, the dry clutch has a technical limitation since the clutch T-S curve should be predicted without using sensors in the state in which it is impossible to measure the actual torque applied to the clutch.

On the other hand, a hydraulic sensor for detecting oil pressure transferred to the surface of a wet clutch from a valve body may be mounted to the wet clutch. Therefore, since the oil pressure in the surface of the clutch may be measured and thus the torque of the clutch may be recognized, it is possible to more accurately check the transfer torque characteristics of the clutch.

SUMMARY

The present disclosure provides a method of learning a clutch touch point for a DCT vehicle, which is capable of checking an engine behavior when a force for disengaging a release-side clutch and a force for engaging an apply-side clutch are applied at the same rate. And the method is for learning a touch point of the apply-side clutch in a torque phase process during gear shifting, thereby realizing shift stability.

In accordance with an aspect of the present disclosure, a method of learning a clutch touch point for a DCT vehicle includes: controlling an amount of slip of a release-side clutch in an allowable range by a controller, when gear shifting is initiated, performing torque crossing control by releasing a release-side clutch torque to a certain level while applying a clutch torque to an apply-side clutch to the same level as the release-side clutch torque by the controller, after the controlling an amount of slip of a release-side clutch, and performing learning determination so as to learn a touch point of the apply-side clutch by the controller, when the amount of slip of the release-side clutch is beyond the allowable range in the performing torque crossing control.

When the amount of slip of the release-side clutch is determined to exceed a maximum allowable amount of slip in the performing learning determination, the touch point of the apply-side clutch may be learned by calculating a shortage of torque of the apply-side clutch.

When the amount of slip of the release-side clutch is determined to be less than a minimum allowable amount of slip in the performing learning determination, a point of time when the amount of slip of the release-side clutch is less than the minimum allowable amount of slip may be learned as the touch point of the apply-side clutch.

The apply-side clutch and the release-side clutch may be a wet-type multi-plate clutch operated by oil pressure, and an oil pressure at the point of time when the amount of slip of the release-side clutch is less than the minimum allowable amount of slip may be learned as the touch point of the apply-side clutch.

In another form, a method of learning a clutch touch point for a DCT vehicle, the method comprising:

controlling an amount of slip of a release-side clutch in a predetermined range by a controller, when gear shifting is initiated;

reducing gradually a release-side clutch torque to a predetermined level while applying a clutch torque to an apply-side clutch by the controller, the applied clutch torque corresponding to the predetermined level of the release-side clutch torque, after the controlling the amount of slip of the release-side clutch; and learning by the controller a touch point of the apply-side clutch when the amount of slip of the release-side clutch is beyond the predetermined range.

As apparent from the above description, it is possible to determine whether or not the touch point is learned using the initial shift process in the torque phase section required to shift gears, and to update the touch point during gear shifting, thereby relieving an impact due to gear shifting to secure shift stability, and improving shift performance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

DETAILED DESCRIPTION

Figure 1:
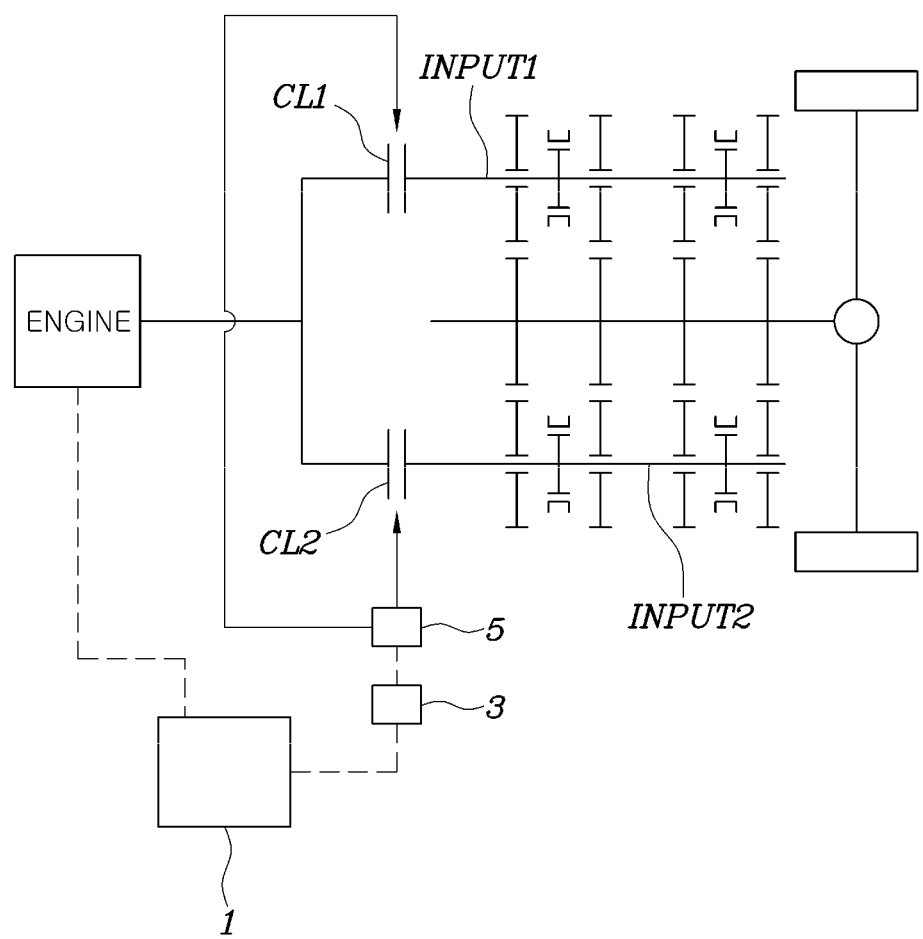
FIG. 1 is a diagram illustrating an overall structure of a vehicle equipped with a DCT.

The following description is merely exemplary in nature and is not intended to limit the present disclosure, application, or uses. It should be understood that throughout the drawings, corresponding reference numerals indicate like or corresponding parts and features.

A method of learning a touch point according to one form of the present disclosure may largely include a slip step, a torque crossing control step, and a learning determination step.

Figure 2:
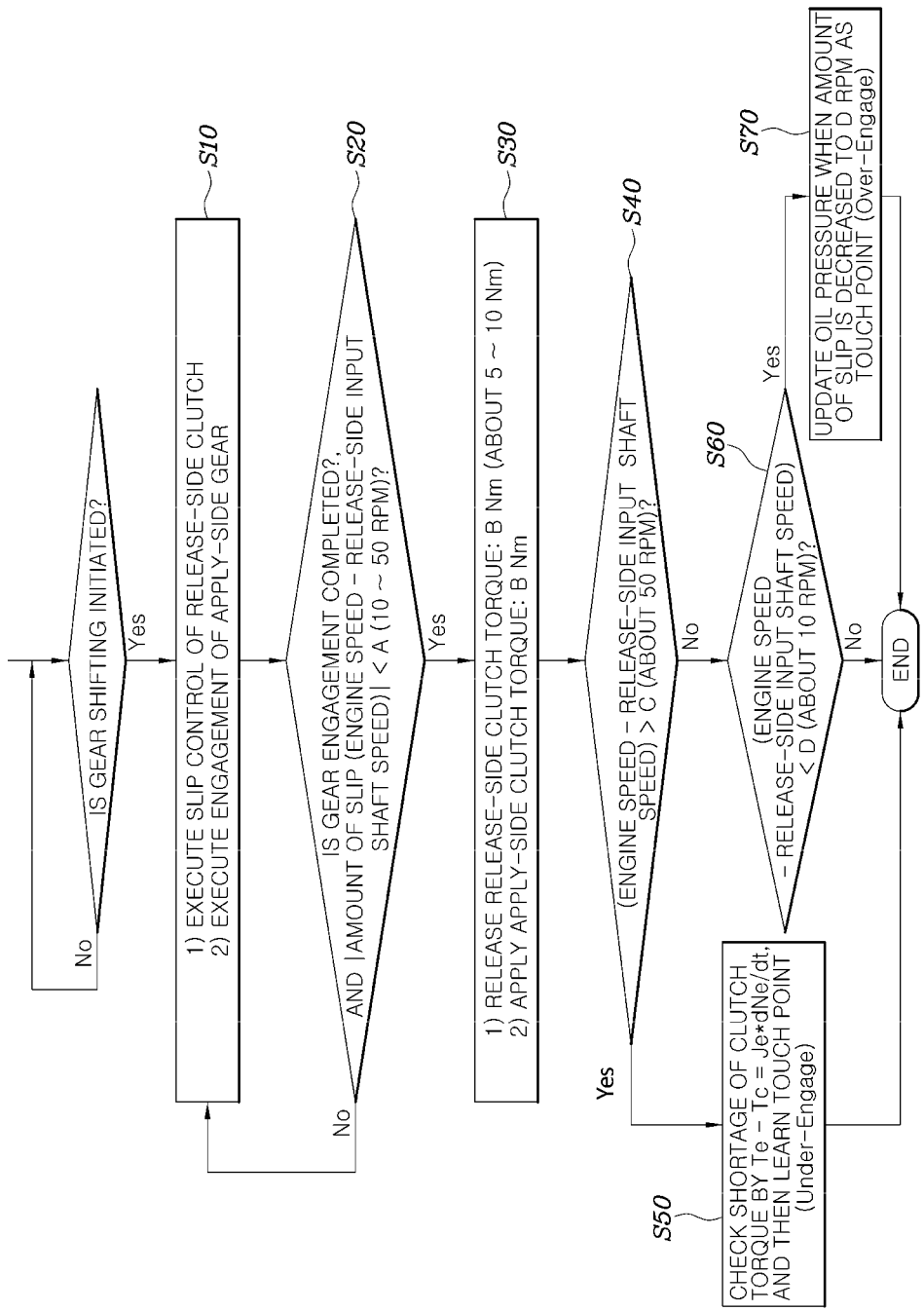
FIG. 2 is a flowchart illustrating a method of learning a touch point.
Figure 3:
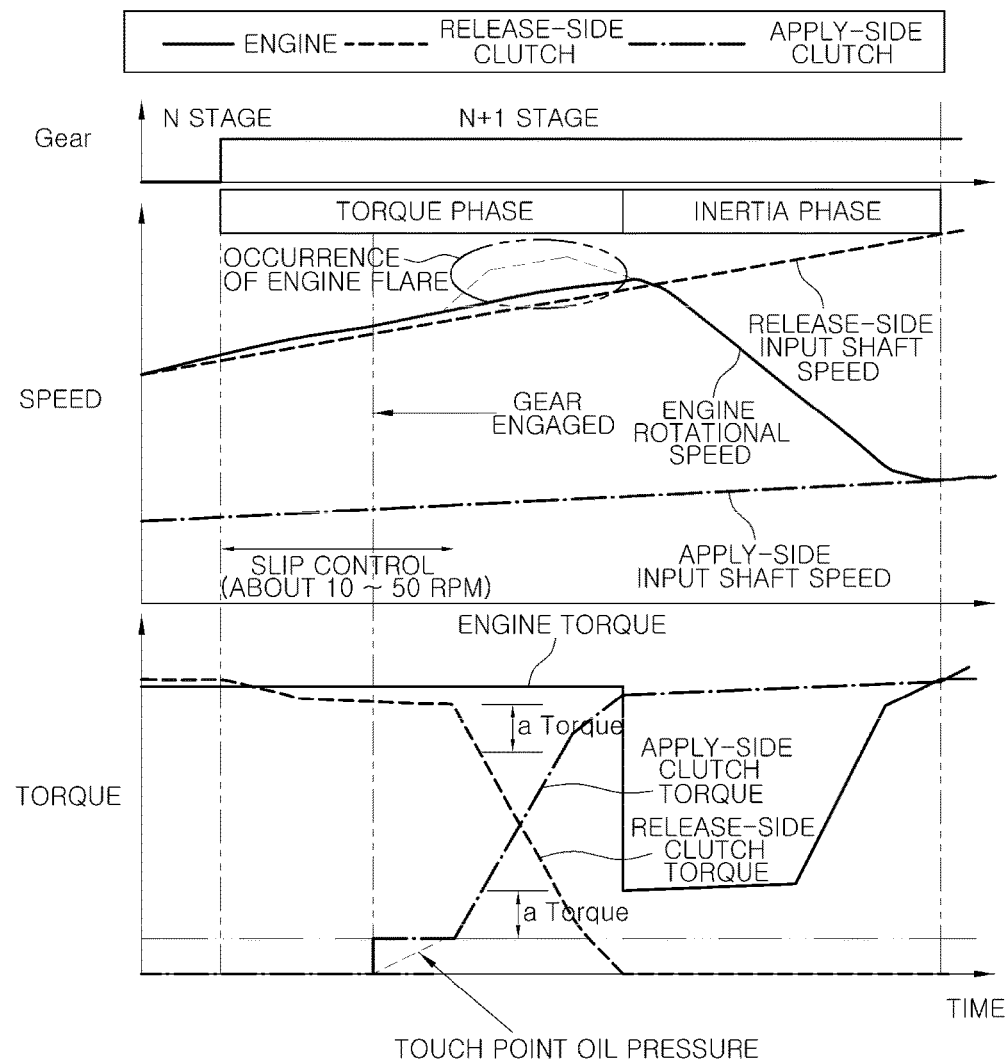
FIG. 3 is a view for explaining behaviors of an engine and a clutch during the learning of the touch point.

The method of learning a touch point will be described with reference to FIGS. 2 and 3. First, in the slip step, a release-side clutch CL2 may be controlled to be slipped in an allowable range by a controller 1 during gear shifting. The maximum and minimum slip, i.e. allowable slip range, can be determined by the skilled artisan based on the engine type, rpm, torque, and gear ratios, and be used to provide smooth shifting.

For example, when an upshift is initiated based on the traveling state of a vehicle, the shift process may first enter a torque phase section, and the release-side clutch CL2 may be controlled to be slipped such that the amount of slip thereof, (i.e. the absolute value of the difference between an engine rotational speed and a release-side input shaft speed) is about 10 to 50 RPM at a point of time of entry into the torque phase.

In this case, the gear in a target shift stage has to be engaged, and an apply-side gear has to be engaged before torque crossing control which will be described later.

In the torque crossing control step, after the slip step, the controller may release a release-side clutch torque to a certain level while a clutch torque is applied to an apply-side clutch CL1 to the same level as the release-side clutch torque.

For example, in the state in which the release-side clutch CL2 is controlled to be slipped in the slip step, the release-side clutch torque may be released to a certain level (e.g., approximately 5 to 10 Nm), and simultaneously the same clutch torque (e.g., approximately 5 to 10 Nm) as the release-side clutch torque may be applied to the apply-side clutch CL1. In this case, the apply-side clutch CL1 may be in the state in which the clutch torque is applied thereto just until the apply-side clutch reaches a touch point before the torque crossing control.

In the learning determination step, when the release-side clutch CL2 is slipped beyond the allowable range in the torque crossing control step, the controller 1 may be set to learn the touch point of the apply-side clutch CL1.

For example, in the case where the torque of the apply-side clutch CL1 is increased from the touch point to a specific level ("a" in FIG. 3) while the torque of the release-side clutch CL2 is decreased to the specific level (a) in the torque phase section, if the apply-side clutch torque is not transferred in proportion to the decreased amount of the release-side clutch torque, an engine flare occurs while the amount of slip of the release-side clutch CL2 is increased. On the other hand, if the apply-side clutch torque is transferred more than the decreased amount of the release-side clutch torque, the amount of slip of the release-side clutch CL2 is rapidly decreased.

That is, the torque phase is desired for the shift process of the DCT vehicle. It is determined whether or not the touch point is learned using the initial shift process in the torque phase, and the touch point is updated during gear shifting. Thus, since an impact due to gear shifting is relieved, shift stability can be secured and shift performance can be improved.

In addition, when the amount of slip of the release-side clutch CL2 is determined to exceed a maximum allowable amount of slip in the learning determination step, the touch point of the apply-side clutch CL2 may be learned by calculating the shortage of the apply-side clutch torque.

For example, in the case where the torques of the apply-side and release-side clutches CL1 and CL2 are controlled so as to cross at the same level in the initial stage of torque phase, if the apply-side clutch torque is not transferred in proportion to the decreased amount of the release-side clutch torque, the difference between the engine rotational speed and the release-side input shaft speed exceeds the maximum allowable amount of slip. In this case, the shortage of the clutch torque is determined by the following equation, and thus the touch point is corrected.

$$Te-Tc=Je*dNe/dt,$$

where Te: engine torque,

Tc: clutch torque,

Je: engine rotational inertia, and dNe/dt: engine angular acceleration.

On the other hand, when the amount of slip of the release-side clutch CL2 is determined to be less than a minimum allowable amount of slip in the learning determination step, a point of time when the amount of slip of the release-side clutch CL2 is less than the minimum allowable amount of slip may be learned as the touch point of the apply-side clutch CL1.

For example, the apply-side clutch CL1 and the release-side clutch CL2 are a wet-type multi-plate clutch operated by oil pressure, and an oil pressure at a point of time when the amount of slip of the release-side clutch CL2 is less than the minimum allowable amount of slip may be learned as the touch point of the apply-side clutch CL1.

In this case, by setting a reference value less than the minimum allowable amount of slip, logic may be designed such that an oil pressure at a point of time when the amount of slip of the release-side clutch CL2 is less than the reference value is learned as the touch point of the apply-side clutch CL1.

That is, in the case where the torques of the apply-side and release-side clutches CL1 and CL2 are controlled so as to cross at the same level in the initial stage of torque phase, if the apply-side clutch torque is transferred more than the decreased amount of the release-side clutch torque when the oil pressure is applied to the surface of each clutch, the amount of slip of the release-side clutch CL2 is less than the minimum allowable amount of slip while being gradually reduced by interlock components. In this case, the oil pressure at the point of time when the amount of slip of the release-side clutch CL2 is less than the minimum allowable amount of slip is updated as the touch point.

Here, in FIG. 1, an apply-side clutch and a release-side clutch from among two clutches included in a DCT, are respectively designated by reference numerals CL1 and CL2, and an apply-side input shaft and a release-side input shaft are respectively designated by reference numerals INPUT1 and INPUT2. However, they are exemplary for the sake of understanding the present disclosure. For example, apply-side and release-side components may be changed to each other according to a clutch used in a current shift stage and in a target shift stage.

When the two clutches included in the DCT are a wet-type multi-plate clutch, the vehicle may further include an electric oil pump 3, a valve body 5, etc. in order to operate the clutch, and a gear actuator may be operated by oil pressure supplied from the valve body.

In addition, since the clutch T-S curve in the wet-type multi-plate clutch are linearly realized with respect to the oil pressure supplied from the valve body, it is possible to more accurately check the transfer torque of the clutch, compared to a dry clutch, and to thus secure the control stability of the clutch.

Meanwhile, since the clutch T-S curve in the dry clutch is a substantially two-dimensional curve, the ratio of torque to stroke may be relatively long in a low-torque section. However, the method of learning a touch point according to the present disclosure may be technically used to compensate for the learning of the touch point in the clutch T-S curve in the dry clutch.

The control flow in the method of learning a touch point for a DCT vehicle will be described with reference to FIGS. 2 and 3.

When the shift process enters the torque phase section after the upshift is initiated based on the traveling state of the vehicle, the apply-side gear is engaged while the release-side clutch CL2 is controlled to be slipped (S10).

Next, it is determined whether the amount of slip of the release-side clutch CL2 is in a set allowable range (approximately 10 to 50 RPM) (S20). When the amount of slip of the release-side clutch CL2 is determined to be in the allowable range, the torque crossing control is executed while the release-side clutch torque is released by approximately 5 to 10 Nm, and the same torque of approximately 5 to 10 Nm is simultaneously applied to the apply-side clutch (S30).

In this case, it may be determined whether the amount of slip of the release-side clutch CL2 is beyond the allowable range. When the amount of slip of the release-side clutch CL2 exceeds the maximum allowable amount of slip (S40), the shortage of torque of the apply-side clutch CL1 is calculated and the touch point is collected based on the calculated shortage of torque (S50).

When the amount of slip of the release-side clutch CL2 is less than the minimum allowable amount of slip (S60), the oil pressure at the point of time when the amount of slip of the release-side clutch CL2 is less than the minimum allowable amount of slip is learned and updated as the touch point of the apply-side clutch CL1 (S70).

As apparent from the above description, it is possible to determine whether or not the touch point is learned using the initial shift process in the torque phase section desired to shift gears, and to update the touch point during gear shifting, thereby relieving an impact due to gear shifting to secure shift stability, and improving shift performance.

Although the several forms of the present disclosure have been disclosed for illustrative purposes, those skilled in the art will appreciate that various modifications, additions and substitutions are possible, without departing from the scope and spirit of the present disclosure.

What is claimed is:

1. A method of learning a clutch touch point for dual clutch transmission (DCT) vehicle, the method comprising:
   controlling an amount of slip of a release-side clutch in an allowable range by a controller, when gear shifting is initiated;
   performing torque crossing control by releasing a release-side clutch torque to a certain level while applying a clutch torque to an apply-side clutch to the same level as the release-side clutch torque by the controller, after the controlling the amount of slip of the release-side clutch; and
   performing learning determination so as to learn the clutch touch point of the apply-side clutch by the controller, when the amount of slip of the release-side clutch is beyond the allowable range in the performing torque crossing control.

2. The method according to claim 1, wherein, when the amount of slip of the release-side clutch is determined to exceed a maximum allowable amount of slip in the performing learning determination, the clutch touch point of the apply-side clutch is learned by calculating a shortage of torque of the apply-side clutch.

3. The method according to claim 1, wherein, when the amount of slip of the release-side clutch is determined to be less than a minimum allowable amount of slip in the performing learning determination, a point of time when the amount of slip of the release-side clutch is less than the minimum allowable amount of slip is learned as the clutch touch point of the apply-side clutch.

4. The method according to claim 3, wherein the apply-side clutch and the release-side clutch are a wet-type multi-plate clutch operated by oil pressure, and the oil pressure at the point of time when the amount of slip of the release-side clutch is less than the minimum allowable amount of slip is learned as the clutch touch point of the apply-side clutch.

5. A method of learning a clutch touch point for dual clutch transmission (DCT) vehicle, the method comprising:
   controlling an amount of slip of a release-side clutch in a predetermined range by a controller, when gear shifting is initiated;
   reducing gradually a release-side clutch torque to a predetermined level while applying a clutch torque to an apply-side clutch by the controller, the applied clutch torque corresponding to the predetermined level of the release-side clutch torque, after the controlling the amount of slip of the release-side clutch; and
   learning by the controller the clutch touch point of the apply-side clutch when the amount of slip of the release-side clutch is beyond the predetermined range.

6. The method according to claim 5, wherein the predetermined range is approximately from 10 to 50 revolution per minute (RPM), and the predetermined level of reducing the release-side clutch torque is approximately from 10 to 50 Nm.

* * * * *